US010198114B2

(12) United States Patent
Lin et al.

(10) Patent No.: US 10,198,114 B2
(45) Date of Patent: Feb. 5, 2019

(54) TOUCH SENSING CIRCUIT AND CONTROL METHOD THEREOF FOR HIGH RESOLUTION FINGERPRINT RECOGNITION

(71) Applicant: AU Optronics Corporation, Hsin-Chu (TW)

(72) Inventors: Wu-Wei Lin, Hsin-Chu (TW); Jui-Chi Lo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 69 days.

(21) Appl. No.: 15/176,546

(22) Filed: Jun. 8, 2016

(65) Prior Publication Data

US 2017/0052629 A1 Feb. 23, 2017

(30) Foreign Application Priority Data

Aug. 17, 2015 (TW) .............................. 104126719 A (51) Int. Cl.
*G06F 3/041* (2006.01)
*G06F 3/044* (2006.01)
*G06K 9/00* (2006.01)

(52) U.S. Cl.
CPC ............ *G06F 3/0416* (2013.01); *G06F 3/044* (2013.01); *G06K 9/0002* (2013.01)

(58) Field of Classification Search
CPC ...... G06F 3/0416; G06F 3/044; G06K 9/0002
See application file for complete search history.

(56) References Cited

U.S. PATENT DOCUMENTS

| 8,232,978 | B2 * | 7/2012 | Chiang | G06F 3/0421 345/102 |
|---|---|---|---|---|
| 8,542,161 | B2 | 9/2013 | Chiang et al. | |
| 9,164,636 | B2 | 10/2015 | Kuo et al. | |
| 2008/0062139 | A1 * | 3/2008 | Hotelling | G02F 1/13338 345/173 |
| 2009/0115735 | A1 * | 5/2009 | Chuang | G02F 1/13338 345/173 |
| 2009/0289915 | A1 * | 11/2009 | Han | G06F 3/0412 345/173 |

(Continued)

FOREIGN PATENT DOCUMENTS

| CN | 101727571 B | 9/2012 |
|---|---|---|
| CN | 102914920 A | 2/2013 |

(Continued)

*Primary Examiner* — Ram A Mistry
(74) *Attorney, Agent, or Firm* — WPAT, PC (57) ABSTRACT

A touch sensing circuit and its control method is disclosed herein. The touch sensing circuit includes a plurality of detecting units. The detecting units are arranged in an array, in which each detecting unit includes a sensing pad, a first switch and a second switch. The first switch is configured to selectively conduct the sensing pad and one of a plurality of signal lines. The second switch is configured to selectively conduct two adjacent sensing pads. When the first switches in a first row in the array are on, the sensing pads in the first row are configured to output detecting signals to the signal lines according to a driving signal, and the second switches in a second row adjacent to the first row are on to conduct the sensing pads in the second row to receive and transmit the driving signal together.

18 Claims, 7 Drawing Sheets

(56) References Cited

U.S. PATENT DOCUMENTS

| | | |
|---|---|---|
| 2010/0098303 A1 | 4/2010 | Chen |
| 2013/0314366 A1 | 11/2013 | Mo et al. |
| 2014/0103941 A1 | 4/2014 | Chou et al. |
| 2014/0253499 A1 | 9/2014 | Lee et al. |

FOREIGN PATENT DOCUMENTS

| | | |
|---|---|---|
| CN | 103207485 A | 7/2013 |
| TW | 201321876 | 6/2013 |
| TW | M498326 | 4/2015 |

* cited by examiner

TOUCH SENSING CIRCUIT AND CONTROL METHOD THEREOF FOR HIGH RESOLUTION FINGERPRINT RECOGNITION

RELATED APPLICATIONS

This application claims priority to Taiwan Application Serial Number 104126719, filed Aug. 17, 2015, which is herein incorporated by reference.

BACKGROUND

Technical Field

The present invention generally relates to a touch sensing circuit, and in particular, to the touch sensing circuit which is able to perform the fingerprint sensing.

Description of Related Art

In the capacitive fingerprint sensing technology nowadays, the capacitance characteristics of the finger ridge and the finger valley in the user's fingerprint are used to output different detecting signals, and by determining the detecting signals to achieve the fingerprint sensing. Therefore, additional scanning lines are needed to be arranged in the fingerprint sensing circuit to provide driving signals.

However, since high resolution are required by the fingerprint sensing to capture the relatively accurate fingerprint characteristics, the area of the sensing pads are limited, and the capacitance sensed is degraded accordingly, which results in the difficulties in processing and determining the detecting signals. In the present structure, the area of the sensing pads are further limited due to the arrangement of the additional scanning lines, or additional manufacturing process are needed to implement the sensing pads and the scanning lines in different metal layers, which increases the cost.

Therefore, the present fingerprint technology cannot provide sufficient driving signal while keeping the area of the sensing pads at the same time. As the area of the sensing pads in the circuit decreases, the sensed capacitance value of the fingerprint sensing decreases with the increasing thickness of the protection film and the difficulties of the fingerprint sensing rise accordingly.

SUMMARY

One aspect of the present invention is a touch sensing circuit. The touch sensing circuit includes a plurality of detecting units. The detecting units are arranged in an array, in which each detecting unit includes a sensing pad, a first switch and a second switch. The first switch is configured to selectively conduct the sensing pad and one of a plurality of signal lines. The second switch is configured to selectively conduct two adjacent sensing pads. When the first switches in a first row in the array are on, the sensing pads in the first row are configured to output detecting signals to the signal lines according to a driving signal, and the second switches in a second row adjacent to the first row are on to conduct the sensing pads in the second row to receive and transmit the driving signal together.

Another aspect of the present invention is a touch sensing circuit. The touch sensing circuit includes a plurality of first sensing pads and a plurality of second sensing pads. In a first operating stage, the first sensing pads are conducted to a plurality of signal lines correspondingly, and the second sensing pads are conducted to each other and configured to receive a driving signal such that the first sensing pads are configured to output a plurality of detecting signals to corresponding signal lines according to the driving signal.

Another aspect of the present invention is a control method. The control method includes: in a first operating stage, conducting the first sensing pads to the corresponding signal lines; conducting the second sensing pads to each other; providing a driving signal to the second sensing pads; and reading, from the signal lines, a plurality of detecting signals outputted by the first sensing pads according to the driving signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present invention, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present invention. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

In the capacitive fingerprint sensing technology, the fingerprint sensing circuit needs extra scanning lines to provide driving signals, such that when a user's finger touches sensing pads arranged in an array, the sensed capacitance generated by the finger ridges and finger valleys works as the medium of the driving signal such that the sensing pads may output the detecting signals to the signal lines respectively. Due to the different finger ridges and finger valleys characteristics of the fingerprint of the users, when different user's finger touches the fingerprint sensing pads, the outputted detecting signals are different. Thus, the fingerprint sensing circuit may achieve the fingerprint sensing function by analyzing the detecting signals.

However, in the circuit design, arranging extra scanning lines limits the area for arranging the sensing pads. With the smaller area of the sensing pads in the circuit, the sensed capacitance is degraded with the increased thickness of the protection film. In addition, the difficulty of performing fingerprint sensing also rises.

Figure 1:
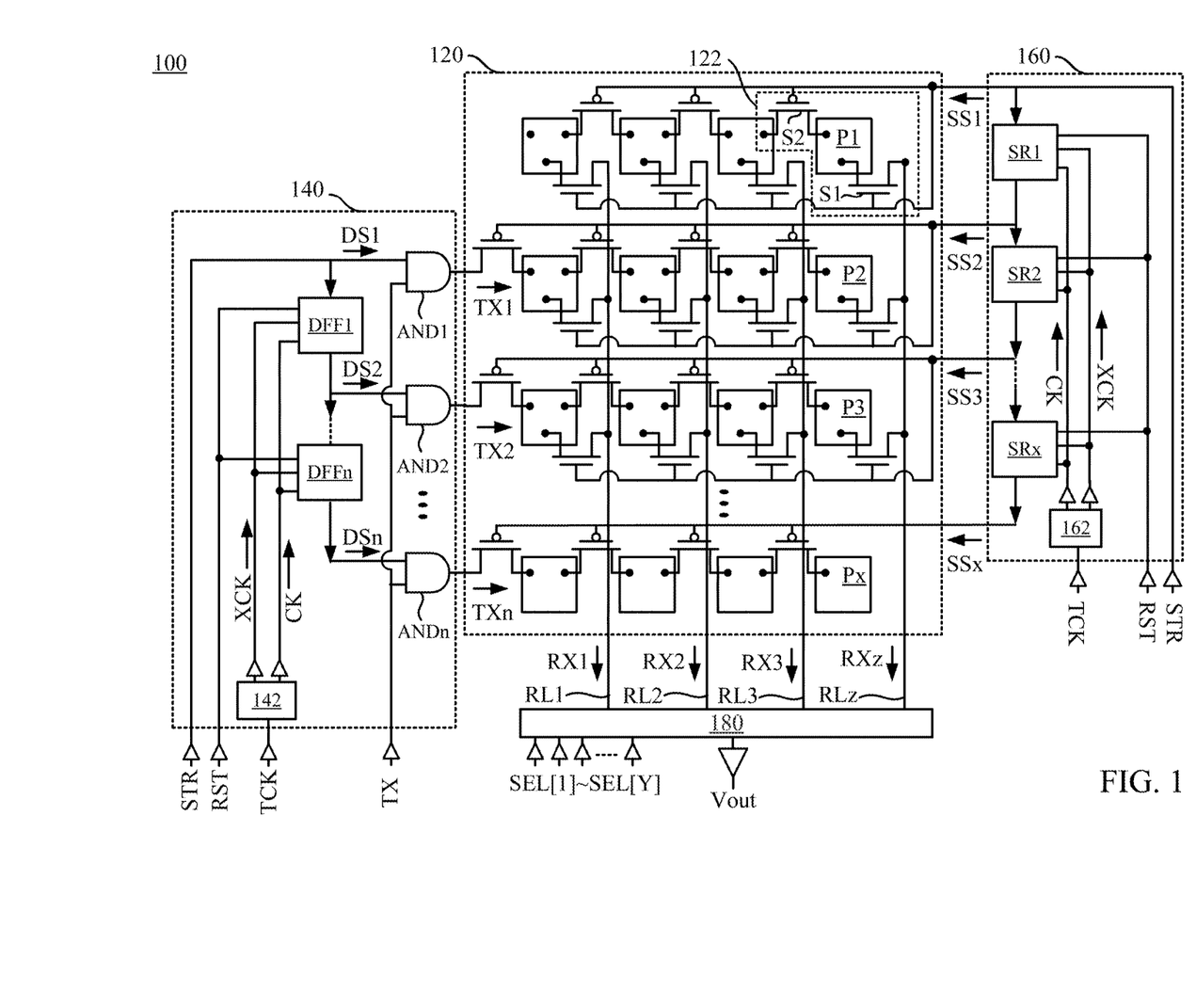
FIG. 1 is a schematic diagram illustrating a touch sensing circuit according to an embodiment of the present invention.

One aspect of the present invention is a touch sensing circuit. In an embodiment of the present invention, the touch sensing circuit may detect the capacitance characteristics of each area of the fingerprint and achieve fingerprint sensing. Reference is made to FIG. 1. FIG. 1 is a schematic diagram illustrating a touch sensing circuit 100 according to an embodiment of the present invention. As illustratively shown in FIG. 1, the touch sensing circuit 100 includes multiple detecting units 122. The detecting units 122 are arranged in an array 120. The signal lines RL1~RLz are electrically coupled to the detecting units 122 in the corresponding column.

In one embodiment of the present invention, the detecting units 122 include a sensing pad P1, switches S1 and S2. The first terminal of the switch S1 is electrically coupled to the sensing pad P1, the second terminal of the switch S1 is electrically coupled to the corresponding one of the signal lines RL1~RLz, and the control terminal of the switch S1 is configured to receive the corresponding one of the control signal SS1~SSx and selectively conduct the sensing pad P1 and corresponding signal lines RL1~RLz according to corresponding control signal SS1~SSx.

As shown in FIG. 1, the first terminal of the switch S2 is electrically coupled to the sensing pad P1, the second terminal of the switch S2 is electrically coupled to the sensing pad P1 of the adjacent detecting unit 122 in the same row, and the control terminal of the switch S2 is configured to receive the corresponding one of the control signal SS1~SSx and selectively conduct the sensing pads P1 of the two adjacent detecting units 122 according to the corresponding control signal SS1~SSx.

In the embodiments shown in FIG. 1, the switches S1 and S2 of the detecting units 122 in the same row may receive the same corresponding control signal SS1~SSx. Since the switches S1 and S2 are implemented by a N-type thin-film transistor (NTFT) and a P-type thin-film transistor (PTFT), when the switches S1 and S2 of the detecting units 122 receive the same control signal (e.g., control signal SS1), the switches S1 and S2 are not turned ON at the same time. Alternatively stated, in any one of the detecting units 122, when the switch S1 conducts the sensing pad P1 and the corresponding signal lines RL1~RLz, the switch S2 is off. On the other hand, when the switch S1 is off, the switch S2 conducts the sensing pads P1 of the two adjacent detecting units 122. It is noted that, the switches S1 and S2 may also be controlled by different signals such that the switch S2 is off when the switch S1 is on, and the switch S1 is off when the switch S2 is on for any one of the detecting units 122. The embodiment shown in FIG. 1 is only for illustrative purpose and not meant to limit the present invention.

In some embodiments, the touch sensing circuit further includes a driving selecting circuit 140, a control circuit 160 and a logic circuit 180. The driving selecting circuit 140 is configured to output the signals TX1~TXn to detecting units 122 in each rows of the array 120. The control circuit 160 is electrically coupled to the control terminal of the switches S1 and of the switches S2, and configured to output the control signal SS1~SSx to control the on and off of the switches S1 and S2 in the array 120 respectively. The logic circuit 180 is electrically coupled to the signal lines RL1~RLz and configured to conduct corresponding signal lines RL1~RLz according to the selecting signal SEL[1] ~SEL[Y] so as to detect the corresponding detecting signal RX1~RXz and read out as the output signal Vout.

Thus, with the operation of the signals TX1~TXn and the control signals SS1~SSx, the touch sensing circuit 100 is able to provide the driving signal without arranging extra scanning lines, such that the sensing pads P1 in the detecting units 122 output the detecting signal RX1~RXz to perform fingerprint sensing. Therefore, the sensing pads P1 may have larger electrode area to improve the resolution and the accuracy of the fingerprint sensing, and the design of the fingerprint sensing device is also simplified.

Figure 2A:
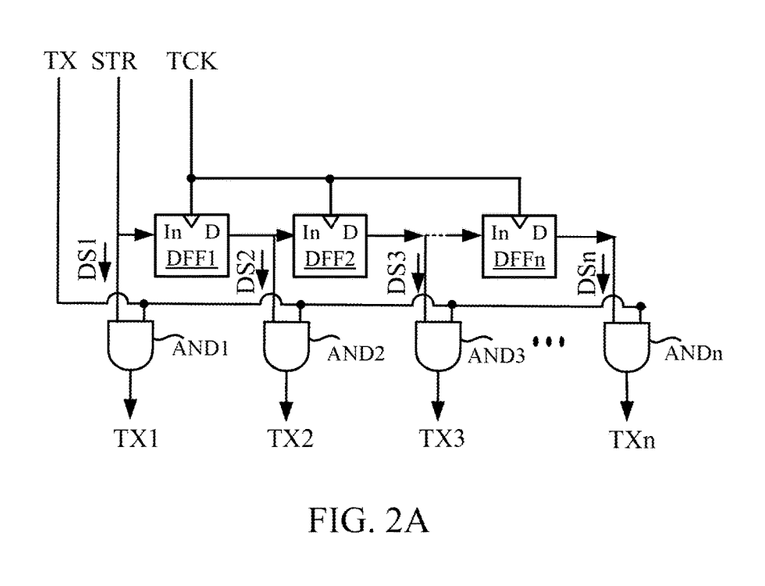
FIG. 2A is a schematic diagram illustrating the driving selecting circuit according to an embodiment of the present invention.
Figure 2B:
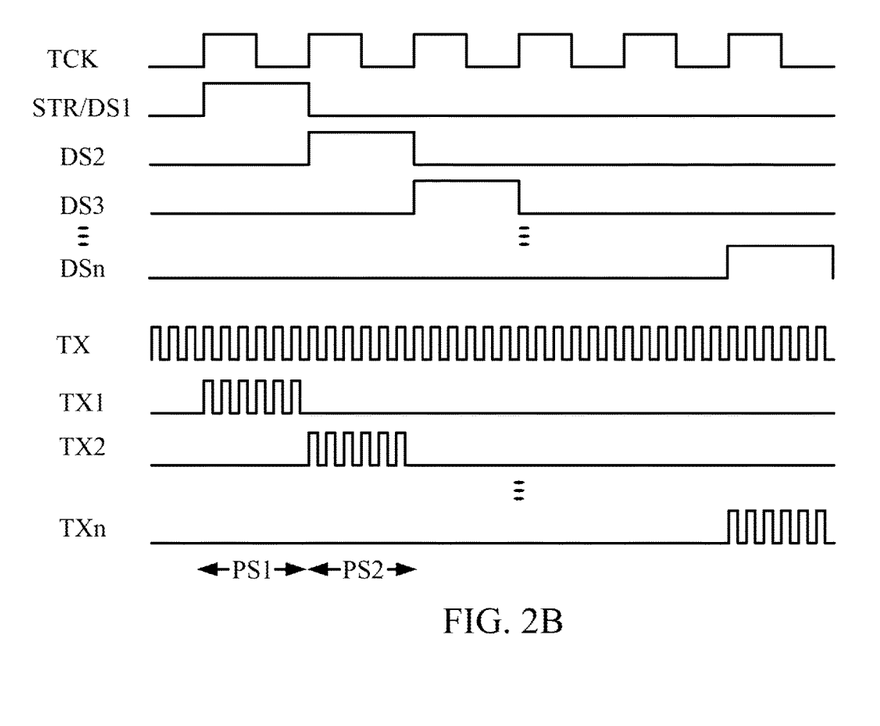
FIG. 2B is a waveform diagram illustrating the related waveforms of the driving selecting circuit according to an embodiment of the present invention.

For better understanding, the specific operating method of the driving selecting circuit 140 is discussed in accompanied with FIG. 2A and FIG. 2B. FIG. 2A is a schematic diagram illustrating the driving selecting circuit 140 according to an embodiment of the present invention. FIG. 2B is a waveform diagram illustrating the related waveforms of the driving selecting circuit 140 according to an embodiment of the present invention.

For example, in the embodiment shown in FIG. 1, the driving selecting circuit 140 includes a non-overlapping clock signal generator 142, delay flip-flops DFF1~DFFn and logic gates AND1~ANDn. The non-overlapping clock signal generator 142 is electrically coupled to the delay flip-flops DFF1~DFFn and configured to provide two complementary clock signals CK and XCK to the delay flip-flops DFF1~DFFn according to the input clock signal TCK. The delay flip-flops DFF1~DFFn are electrically coupled in series and configured to receive the clock signals CK and XCK, the reset signal RST and the signal outputted by the delay flip-flop in the former stage, and output the delayed signal to the delay flip-flop in the latter stage. Thus, after the delay flip-flop DFF1 receives the activating signal STR, the delay flip-flops DFF1~DFFn are able to output the activating signals DS1~DSn respectively. The logic gate AND1~ANDn are electrically coupled to the delay flip-flops DFF1~DFFn respectively and configured to receive the scanning signal TX having high frequency and receive the activating signals DS1~DSn respectively to perform logic operation so as to output the signals TX1~TXn to the array 120 respectively.

As illustratively shown in FIG. 2A and FIG. 2B, the logic gate AND1~ANDn may be and gates. Alternatively stated, when the activating signal DS1 is high, the signal TX1 outputted by the logic gate AND1 has the switching frequency corresponding to the scanning signal TX. When the activating signal DS1 is low, the signal TX1 outputted by the logic gate AND1 is hold at the low level. Therefore, the driving selecting circuit 140 may perform time-sharing to the high frequency scanning signal TX using the activating signal DS1~DSn to control the signal TX1 has the switching frequency of the scanning signal TX during the first operating stage PS1, and the signal TX2 has the switching frequency of the scanning signal TX during the second operating stage PS2, and so on. By the above operations, it is ensured that when high frequency driving signals are provided, the interference to the signal lines RL1~RLz resulted from the driving signals is avoided.

Similar to the driving selecting circuit 140, in the embodiment illustratively shown in FIG. 1, the control signal 160 includes non-overlapping clock signal generator 162 and shift registers SR1~SRx. The non-overlapping clock signal generator 162 is electrically coupled to the shift registers SR1~SRx and configured to provide two complementary clock signals CK and XCK to the shift registers SR1~SRx according to the input clock signal TCK. The shift registers SR1~SRx are electrically coupled in series and configured to receive the clock signals CK and XCK, the reset signal RST and the signal outputted by the shift register in the former stage, and output the shifted signal to the shift register in the latter stage. Thus, after the shift register SR1 receives the activating signal STR, the shift registers SR1~SRx are able to output the control signals SS1~SSx respectively.

It is noted that the driving selecting circuit 140 and the control circuit 160 may be implemented by various ways, and the examples shown in FIG. 1 and FIG. 2A are only for illustratively purpose and not meant to limit the present invention. For example, in some embodiments, the driving selecting circuit 140 may also choose the shift register to replace the delay flip-flop to output the delayed signals DS1~DSn.

For better understanding, the operating method of the touch sensing circuit 100 using the signals TX1~TXn and the control signals SS1~SSx will be discussed in accompanied with the FIG. 3A and FIG. 3B, but the present invention is not limited thereto.

Figure 3A:
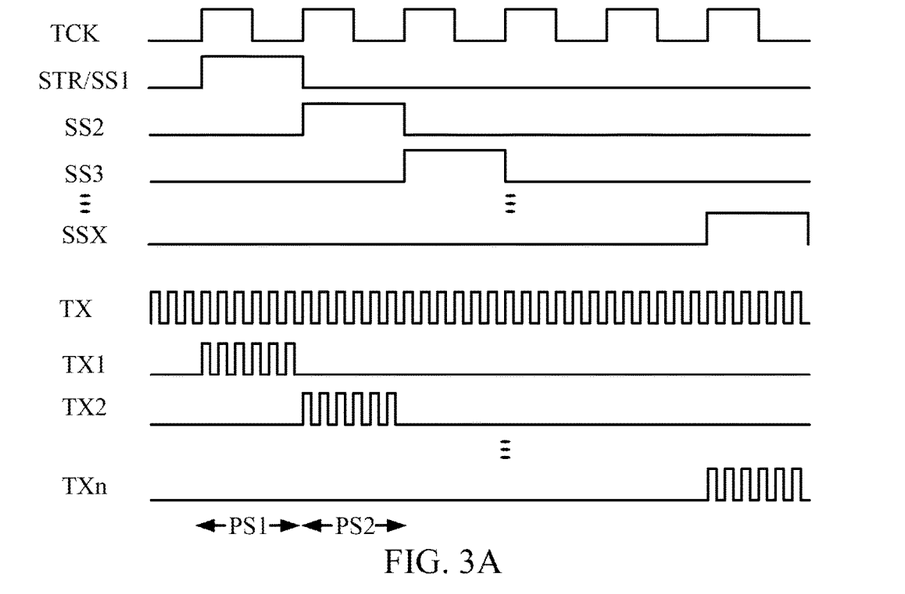
FIG. 3A and FIG. 3B are the waveform diagrams illustrating signals in different operating stages of the touch sensing circuit according to an embodiment of the present invention.
Figure 3B:
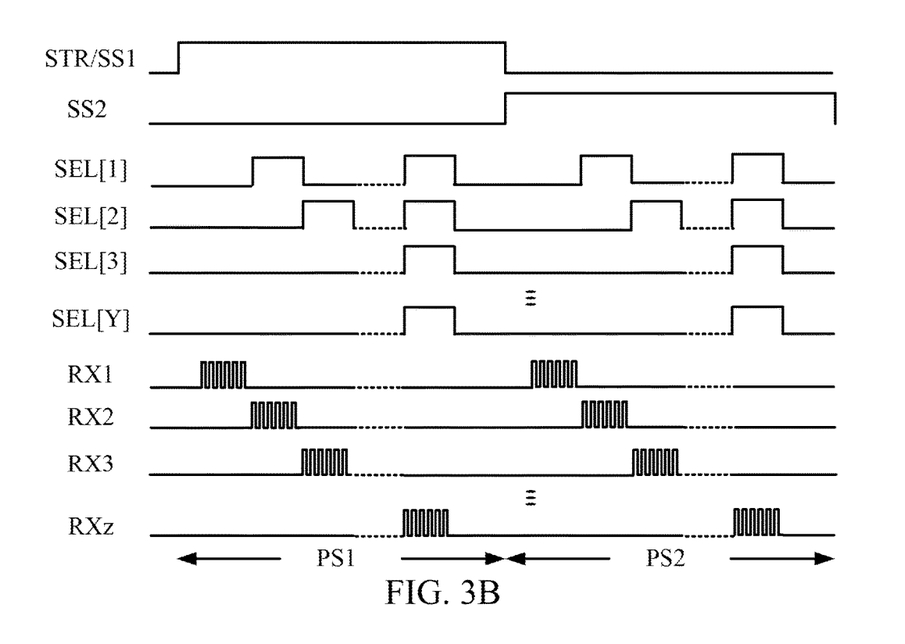

FIG. 3A and FIG. 3B are the waveform diagrams illustrating signals in different operating stages of the touch sensing circuit 100 according to an embodiment of the present invention. As illustratively shown in FIG. 3A, in the first operating stage PS1, the control signal SS1 is at a first level (e.g., a high level), and the control signal SS2 is at a second level (e.g., a low level). In accordance with the above mentioned control signals SS1 and SS2, the switches S1 in the detect units 122 of the first row in the array 120 are on (i.e., the switches S2 in the first row are off), and the switches S2 in a second row, which is adjacent to the first row, of the array 120 are on (i.e., the switches S1 in the second row are off).

Therefore, the driving signal (i.e., the signal TX1 having high frequency in the first operating stage PS1) outputted by the driving selecting circuit 140 may be transmitted via the turned-on switches S2 in the second row and the sensing pads P2 in the second row. The corresponding sensing pads P1 in the first row are able to output the detecting signals RX1~RXz to the signal lines RL1~RLz respectively according to the driving signal (i.e., the signal TX1 having high frequency in the first operating stage PS1).

Alternatively stated, during the first operating stage PS1, the sensing pads P2 in the second row are electrically coupled in series to each other and work as the scanning lines providing the driving signal. Therefore, no extra scanning lines are needed to be arranged in the touch sensing circuit 100 to provide the driving signal, and the sensing pads P1 and P2 in the touch sensing circuit may have larger area to generate the sensed capacitance with the fingers such that better sensing signal amount is received with the detecting signals RX1~RXz and the higher accuracy and identification rate of the fingerprint signal are achieved.

It is noted that to avoid the interference between the driving signal (i.e., the signals TX1 having high frequency in the first operating stage PS1) and the detecting signals RX1~RXz, in some embodiments, when the switches S1 in the first row are on, the control signals SS3~SSx are also configured to control the switches S2 in other rows of the array 120 to be on to conduct the sensing pads P3~Px in the same row. The sensing pads P3 in the third row of the array 120 are configured to receiving a shielding signal (i.e., the signal TX2 having a fixed voltage level such as a low level or a high level in the first operating stage PS1) to reduce the interference between the driving signal TX1 and the detecting signals RX1~RXz.

Since the voltage signal TX2 of the sensing pads P3 in the third row of the array 120 is kept at the low level, the voltage signal TX2 of the sensing pads PS3 does not disturb the detecting signal RX1~RXz on the signal lines RL1~RLz at the overlapped area of the sensing pads PS3 and the signal lines RL1~RLz. Thus, the interference to the signal lines RL1~RLz may be reduced effectively.

It is noted that, in the present embodiment, the driving selecting circuit 140 is configured to output the driving signal (i.e., the signal TX1 having high frequency) to the sensing pads P2 in the second row and output the shielding signal (i.e., the signal TX2 having low level) to the sensing pads P3 in the third row.

Therefore, as illustratively shown in FIG. 3B, in the first operating stage PS1, the logic circuit 180 is able to conduct the corresponding signal lines RL1~RLz according to the selecting signals SEL[1]~SEL[Y] to detect the corresponding detecting signals RX1~RXz, and read out as the output signal Vout. For example, when the selecting signals SEL[1]~SEL[Y] are all at the low level, the logic circuit 180 conducts the signal lines RL1 to read the detecting signal RX1. When the selecting signal SEL[1] is at the high level and the selecting signals SEL[2]~SEL[Y] are at the low level, the logic circuit 180 conducts the signal lines RL2 to read the detecting signal RX2. By repeating the operation, the touch sensing circuit 100 may be configured to read out the detecting signals RX1~RXz sequentially.

Figure 4A:
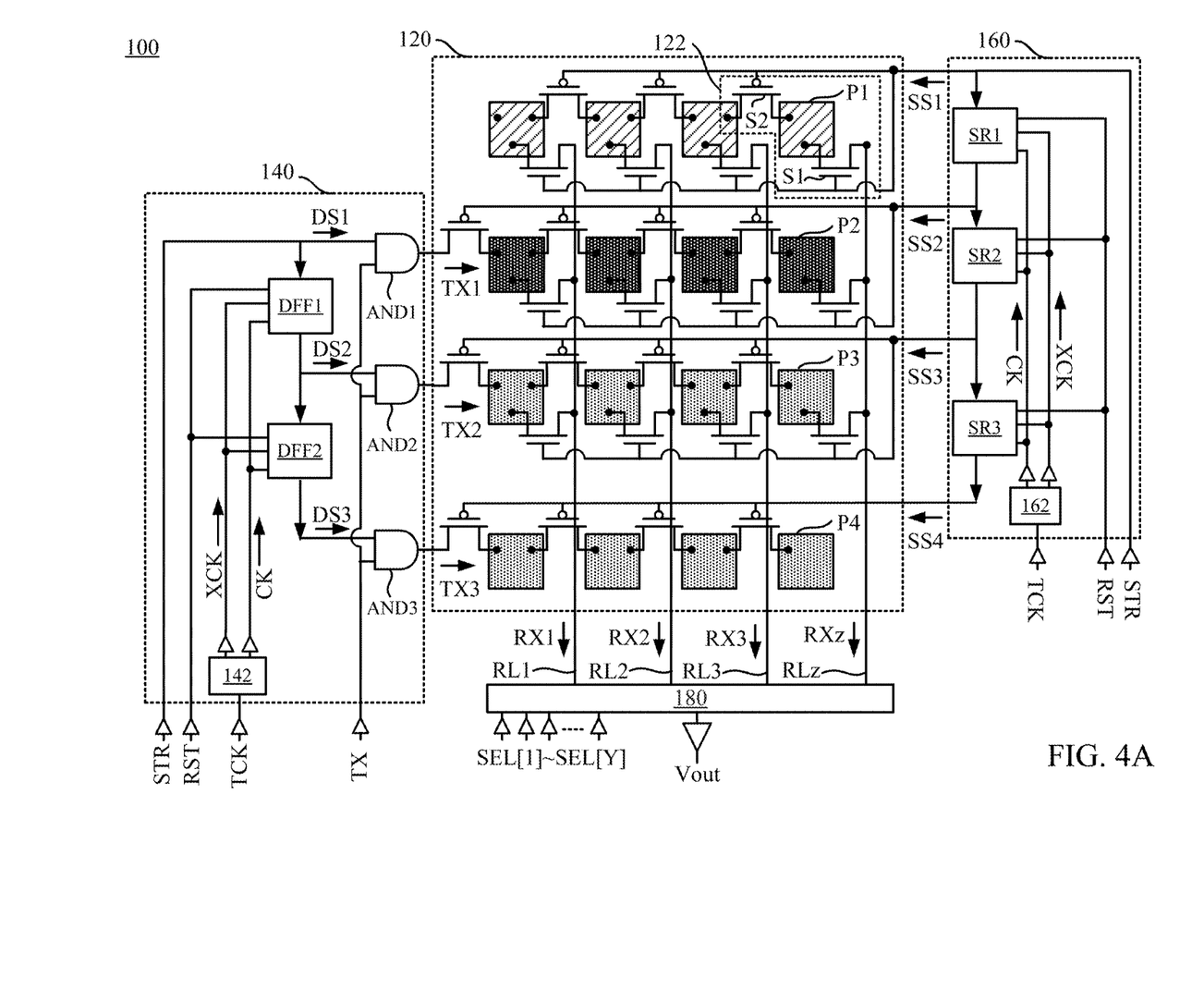
FIG. 4A is a schematic diagram illustrating the operation of the touch sensing circuit in the first operating stage according to an embodiment of the present invention.

FIG. 4A is a schematic diagram illustrating the operation of the touch sensing circuit 100 in the first operating stage PS1 according to an embodiment of the present invention. In the present embodiment, in the first operating stage PS1, the sensing pads P1 in the first row are configured to output the detecting signals RX1~RXz respectively, according to the driving signal, to the signal lines RL1~RLz. The sensing pads P2 are electrically coupled to each other in series and configured to transmit the driving signal (e.g., the signal TX1 having high frequency) outputted by the driving selecting circuit 140. The sensing pads P3 and P4 are electrically coupled to each other in series respectively and configured to transmit the shielding signal (e.g., the signal TX2 and TX3 having low level) outputted by the driving selecting circuit 140.

Reference is made to FIG. 3A and FIG. 3B again. When entering the second operating stage PS2, the control signal SS1 is switched back to the second level (e.g., low level). The control signal SS2 is at the first level (e.g., high level), and the control signal SS3 is at the second level (e.g., low level). In accordance with the above mentioned control signals SS2 and SS3, the switches S1 in the detect units 122 of the second row in the array 120 are on (i.e., the switches S2 in the second row are off), and the switches S2 in the third row, which is adjacent to the second row, of the array 120 are on (i.e., the switches S1 in the third row are off). The driving signal (i.e., the signal TX2 having high frequency) outputted by the driving selecting circuit 140 may be transmitted via the turned-on switches S2 in the third row and the sensing pads P3 in the third row. The corresponding sensing pads P2 in the second row are able to output the detecting signals RX1~RXz to the signal lines RL1~RLz respectively according to the driving signal (i.e., the signal TX2 having high frequency). Similarly, in the second operating stage PS2, the logic circuit 180 may be configured in accordance with the operation of the selecting signals SEL[1]~SEL[Y] such that the touch sensing circuit 100 reads out the detecting signal RX1~RXz sequentially.

Figure 4B:
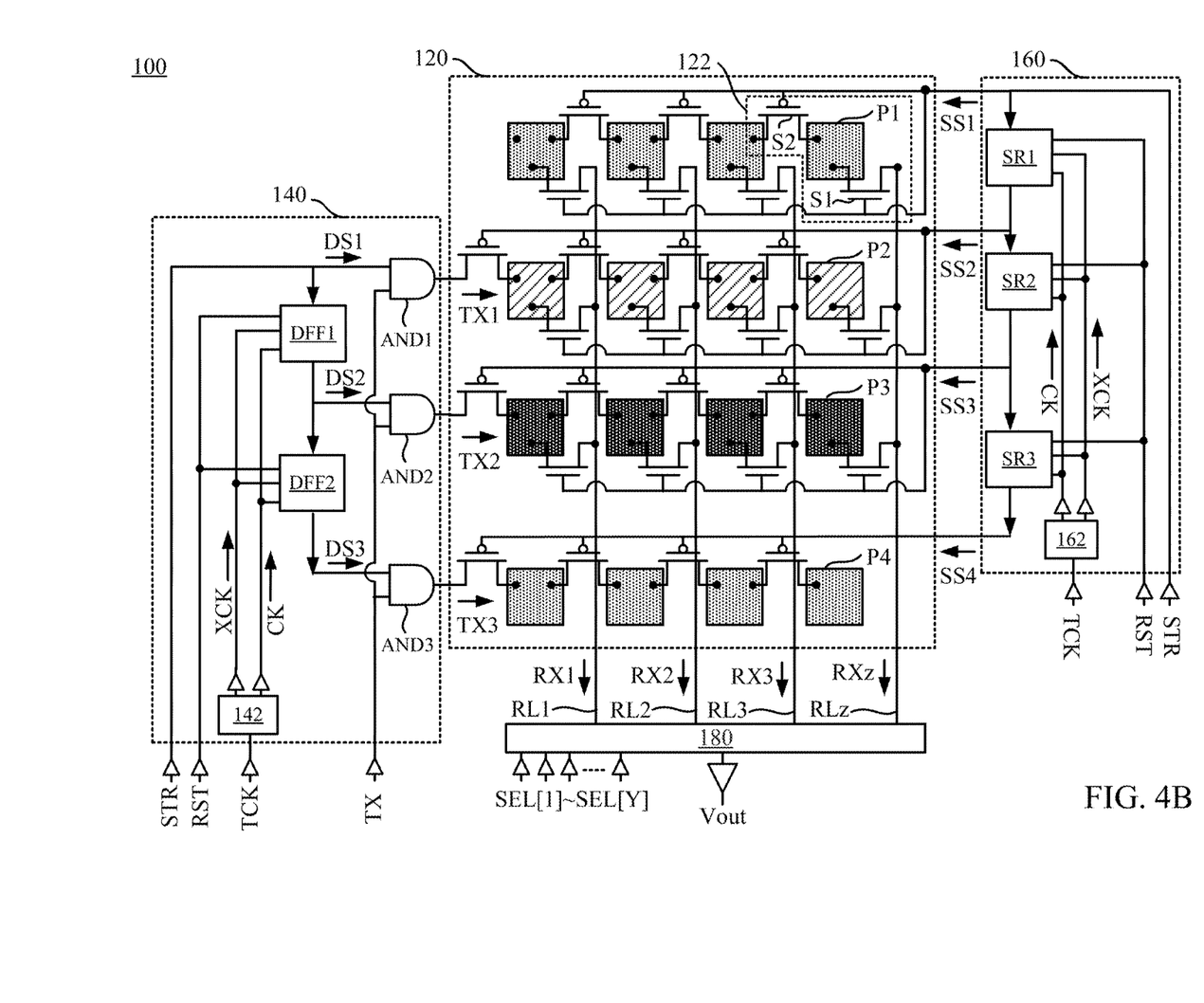
FIG. 4B is a schematic diagram illustrating the operation of the touch sensing circuit in the second operating stage according to an embodiment of the present invention.

FIG. 4B is a schematic diagram illustrating the operation of the touch sensing circuit 100 in the second operating stage PS2 according to an embodiment of the present invention. In the present embodiment, in the second operating stage PS2, the sensing pads P2 in the second row are configured to output the detecting signals RX1~RXz respectively, according to the driving signal, to the signal lines RL1~RLz. The sensing pads P3 of the third row are electrically coupled to each other in series and configured to transmit the driving signal (e.g., the signal TX2 having high frequency) outputted by the driving selecting circuit 140. The sensing pads P4 in other row are electrically coupled to each other in series and configured to transmit the shielding signal (e.g., the signal TX3 having low level) outputted by the driving selecting circuit 140.

Repeating the above operation, by using the control signals SS1~SSx to turn on the switches S1 in each rows sequentially and conducting the switches S2 in the next row to provide signals TX1~TXn, the touch sensing circuit 100 may be configured to read out the detecting signals RX1~RXz sensed by the sensing pads P1~Px in each rows and fully collect the capacitance characteristics of the finger valley and the finger ridge of the user's fingerprint to achieve the fingerprint sensing function.

Figure 5:
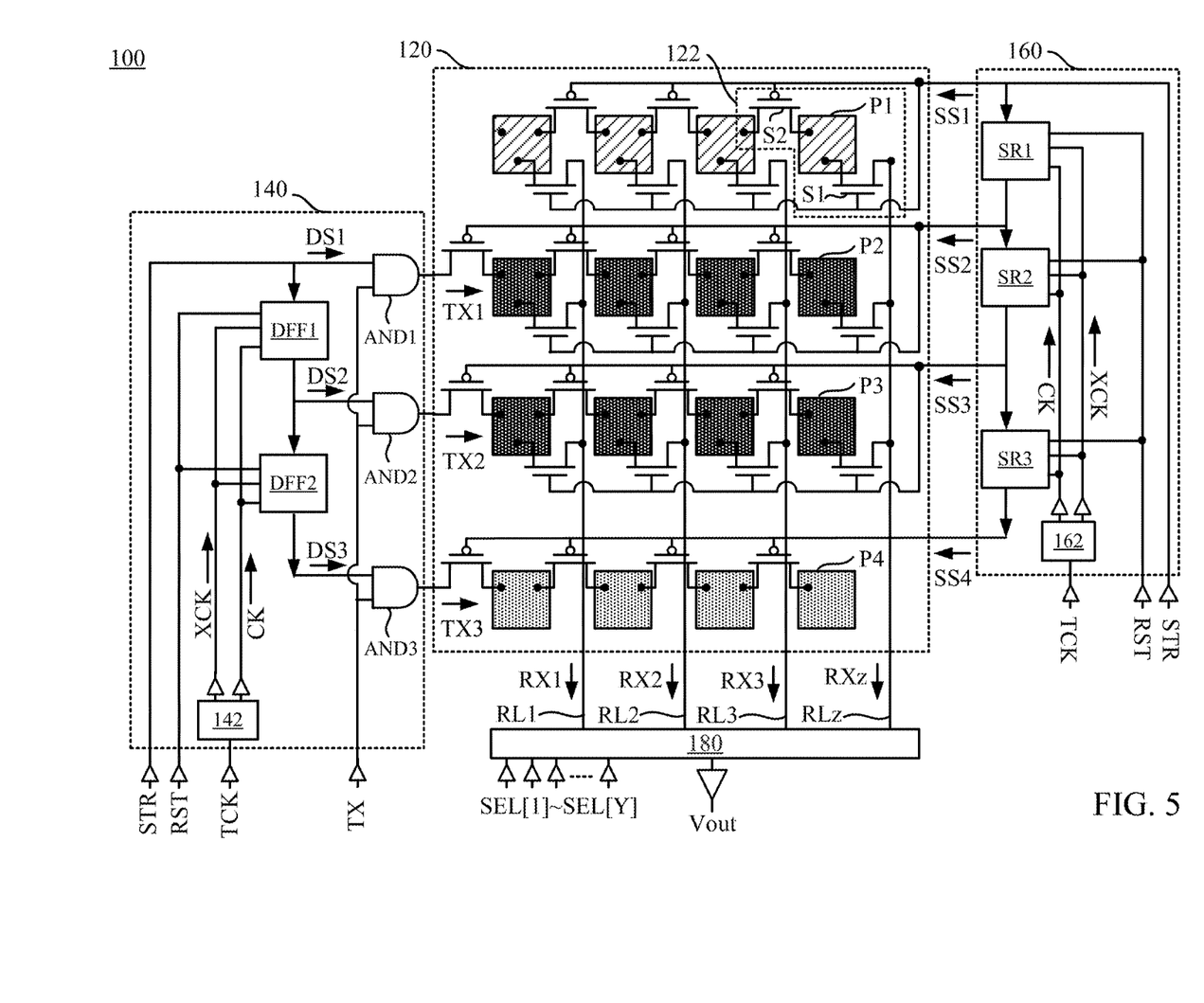
FIG. 5 is a schematic diagram illustrating a touch sensing circuit according to an embodiment of the present invention.

It is noted that the driving selecting circuit 140 may be configured to receive the scanning signal TX according to actual needs and output the driving signal (i.e., the signal with high frequency) and shielding signal (i.e., the signal with low level) according to the scanning signal TX and activating signals DS1~DSn corresponding to each rows of the array 120. For example, as illustratively shown in FIG. 5, the driving selecting circuit 140 may also use the signal TX1 and TX2 as the driving signal at the same time such that when the sensing pads P2 in the second row are configured to receive and transmit the driving signal together, the sensing pads P3 in the third row of the array 120 are also configured to receive and transmit the driving signal together. Therefore, the sensing pads P2 and P3 of two rows work as the scanning lines to increase the signal strength of the driving signal. Alternatively stated, the period of the signal TX1~TXn to be high frequency signal may be overlapped to dynamically adjust the ratio of the rows in the array 120 to provide the driving signal or provide the shielding signal.

Figure 6:
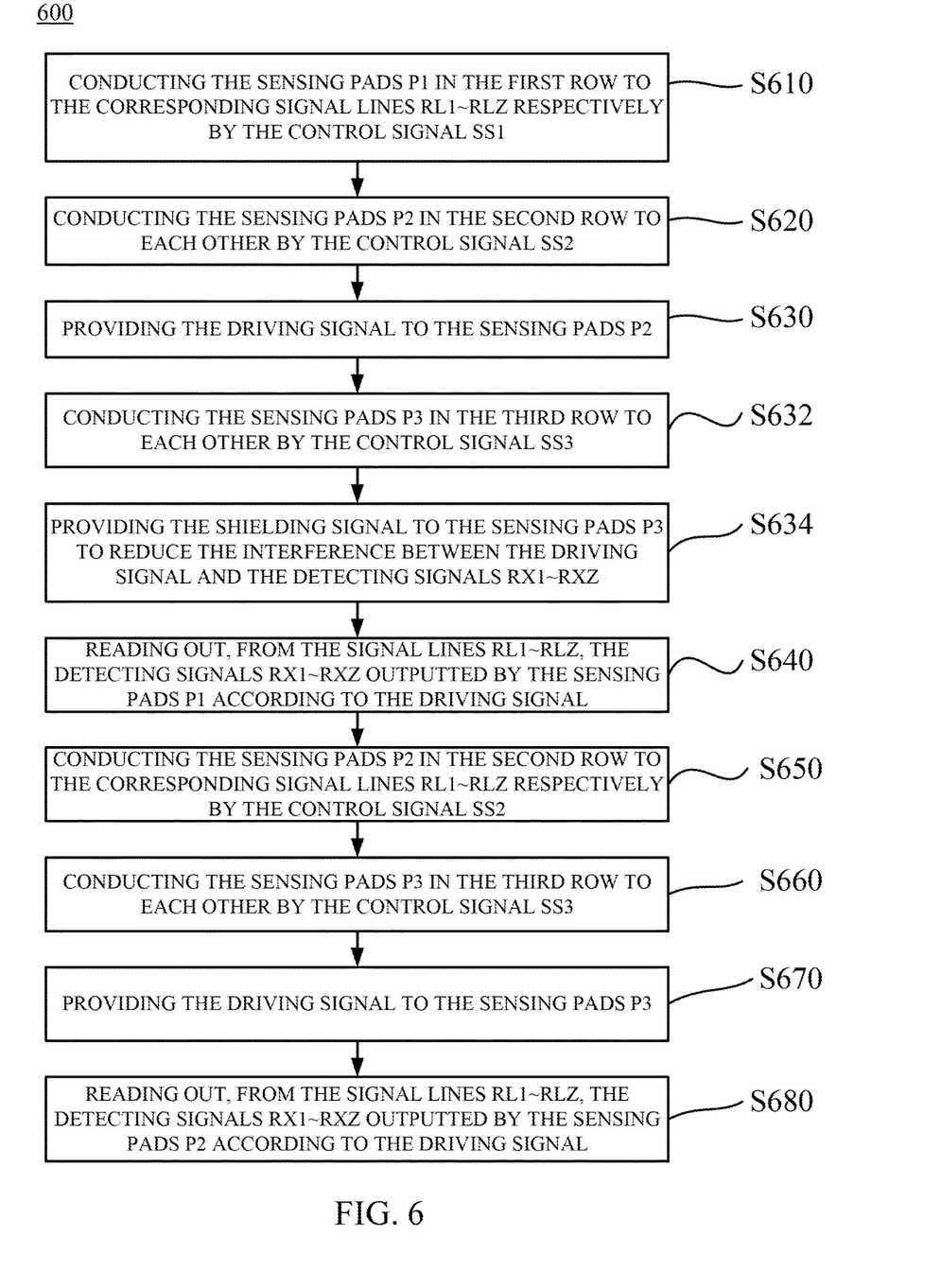
FIG. 6 is a flowchart illustrating the control method according to an embodiment of the present invention.

Another aspect of the present invention is a control method of the touch sensing circuit. Reference is made to FIG. 6. FIG. 6 is a flowchart illustrating the control method 600 according to an embodiment of the present invention. For better understanding, the control method 600 will be discussed in accompanied with the touch sensing circuit shown in FIG. 1~FIG. 5, but the present invention is not limited thereto. As shown in FIG. 6, the control method 600 includes steps S610~S680.

First, in the step S610, in the first operating stage PS1, the control circuit 160 conducts the sensing pads P1 in the first row to the corresponding signal lines RL1~RLz respectively by the control signal SS1. Next, in the step S620, the control circuit 160 conducts the sensing pads P2 in the second row to each other by the control signal SS2. Next, in the step S630, the driving selecting circuit 140 provides the driving signal (i.e., the signal TX1) to the sensing pads P2. Next, in the step S640, the logic circuit 180 reads out, from the signal lines RL1~RLz, the detecting signals RX1~RXz outputted by the sensing pads P1 according to the driving signal (i.e., the signal TX1).

In step S650, in the second operating stage PS2, the control circuit 160 conducts the sensing pads P2 in the second row to the corresponding signal lines RL1~RLz respectively by the control signal SS2. Next, in the step S660, the control circuit 160 conducts the sensing pads P3 in the third row to each other by the control signal SS3. Next, in the step S670, the driving selecting circuit 140 provides the driving signal (i.e., the signal TX2) to the sensing pads P3. Next, in the step S680, the logic circuit 180 reads out, from the signal lines RL1~RLz, the detecting signals RX1~RXz outputted by the sensing pads P2 according to the driving signal (i.e., the signal TX2).

Thus, the touch sensing circuit 100 may be configured to provide the driving signal to the sensing pads P1~Px in the array 120 without arranging extra scanning lines, to achieve the fingerprint sensing function.

In some embodiments, the control method further includes steps S632 and S634. In step S632, in the first operating stage PS1, the control circuit 160 conducts the sensing pads P3 in the third row to each other by the control signal SS3. Next, in the step S634, the driving selecting circuit 140 provides the shielding signal to the sensing pads P3 to reduce the interference between the driving signal and the detecting signals RX1~RXz.

Those skilled in the art can immediately understand how to perform the operations and functions of the control method 600 based on the touch sensing circuit 100 in the embodiments described above, and thus a further explanation is omitted herein for the sake of brevity.

The above description includes exemplary operations, but the operations are not necessarily performed in the order described. The order of the operations disclosed in the present invention may be changed, or the operations may even be executed simultaneously or partially simultaneously as appropriate, in accordance with the spirit and scope of various embodiments of the present invention.

In summary, by applying the various embodiments discussed above, the touch sensing circuit is able to provide driving signal without arranging extra scanning lines, and use the sensing pads in the detecting units to output driving signals to perform fingerprint sensing. Thus, the sensing pads may have larger electrode area to increase the resolution and the accuracy of the fingerprint sensing, and the design of the fingerprint sensing circuit may be simplified.

Although the disclosure has been described in considerable detail with reference to certain embodiments thereof, it will be understood that the embodiments are not intended to limit the disclosure. It will be apparent to those skilled in the art that various modifications and variations can be made to the structure of the present invention without departing from the scope or spirit of the invention. In view of the foregoing, it is intended that the present invention cover modifications and variations of this disclosure provided they fall within the scope of the following claims.

What is claimed is:

1. A touch sensing circuit, comprising:
a plurality of detecting units arranged in an array, wherein each detecting unit includes:
a sensing pad;
a first switch configured to selectively conduct the sensing pad and one of a plurality of signal lines; and
a second switch configured to selectively conduct the sensing pads of the detecting unit and the adjacent detecting unit;
wherein in a first operating stage, the first switches in a first row of the array are turned on, such that the sensing pads in the first row are configured to output a plurality of detecting signals to the signal lines according to a first driving signal, and the second switches in a second row of the array adjacent to the first row are turned on, such that the sensing pads in the second row are electrically coupled in series to receive the first driving signal;
wherein in a second operating stage, the first switches in the second row of the array are turned on, such that the sensing pads in the second row are configured to output a plurality of detecting signals to the signal lines according to a second driving signal, and the second switches in a third row of the array adjacent to the second row are turned on, such that the sensing pads in the third row are electrically coupled in series to receive the second driving signal.

2. The touch sensing circuit of claim 1, wherein in the first operating stage, the first switches in the third row of the array are turned on, such that the sensing pads in the third row receive a shielding signal having a fixed voltage level.

3. The touch sensing circuit of claim 2, further comprising:
a driving selecting circuit configured to output the first driving signal to the sensing pads in the second row and output the shielding signal to the sensing pads in the third row during the first operating stage.

4. The touch sensing circuit of claim 3, wherein the driving selecting circuit is configured to output the first driving signal and the shielding signal according to a scanning signal and a plurality of trigger signals corresponding to the rows of the array.

5. The touch sensing circuit of claim 1, wherein the second switch of one of the detecting units is turned off while at the same time the first switch of the one of the detecting units is turned on; and wherein the second switch of the one of the detecting units is turned on while at the same time the first switch of the one of the detecting units is turned off.

6. The touch sensing circuit of claim 1, further comprising:
a control circuit configured to output a plurality of control signals to control the first switches and the second switches of the array to be on or off.

7. The touch sensing circuit of claim 6, wherein each of the first switches of the detecting unit comprises:
a first terminal electrically coupled to the corresponding sensing pad;
a second terminal electrically coupled to the corresponding signal line; and
a control terminal electrically coupled to the control circuit and configured to receive the corresponding control signal.

8. The touch sensing circuit of claim 1, wherein the sensing pads in the third row of the array are electrically coupled in series to receive the first driving signal in the first operating stage.

9. A touch sensing circuit, comprising:
a plurality of first sensing pads;
a plurality of second sensing pads; and
a plurality of third sensing pads;
wherein in a first operating stage, the first sensing pads are conducted to a plurality of signal lines correspondingly according to a first control signal, and the second sensing pads are electrically coupled in series to receive a first driving signal such that the first sensing pads are configured to output a plurality of detecting signals to corresponding signal lines according to the first driving signal, wherein within the first operating stage the first driving signal has a non-zero frequency while the first control signal remains at the same level;
wherein in a second operating stage, the second sensing pads are conducted to the signal lines correspondingly, and the third sensing pads are electrically coupled in series to receive a second driving signal such that the second sensing pads are configured to output the detecting signals to corresponding signal lines according to the second driving signal.

10. The touch sensing circuit of claim 9, wherein in the first operating stage, the third sensing pads are electrically coupled in series to receive a shielding signal to reduce the interference between the first driving signal and the detecting signals.

11. The touch sensing circuit of claim 9, further comprising:
a control circuit configured to output a plurality of control signals to control the touch sensing circuit for operation in the first operating stage or the second operating stage.

12. The touch sensing circuit of claim 9, further comprising:

a plurality of first switches each configured to selectively conduct the corresponding first sensing pad and the corresponding signal line; and a plurality of second switches each configured to selectively conduct the corresponding adjacent second sensing pads;

wherein the first switches and the second switches are different type transistors.

13. The touch sensing circuit of claim 12, further comprising:

a control circuit configured to output a plurality of control signals;

wherein each of the first switches comprises:

a first terminal electrically coupled to the corresponding first sensing pad;

a second terminal electrically coupled to the corresponding signal line; and a control terminal electrically coupled to the control circuit and configured to receive the corresponding control signal.

14. The touch sensing circuit of claim 13, wherein each of the second switches comprises:

a first terminal and a second terminal respectively electrically coupled to the corresponding adjacent first sensing pads; and a control terminal electrically coupled to the control circuit and configured to receive the corresponding control signal.

15. The touch sensing circuit of claim 9, wherein a plurality of fourth sensing pads are electrically coupled in series to receive the first driving signal in the first operating stage.

16. A control method of a touch sensing circuit, wherein the touch sensing circuit comprises a plurality of signal lines, a plurality of first sensing pads, a plurality of second sensing pads and a plurality of third sensing pads, and the control method comprises:

in a first operating stage, conducting the first sensing pads to the corresponding signal lines;

in the first operating stage, electrically coupling the second sensing pads in series;

in the first operating stage, providing a first driving signal to the second sensing pads;

in the first operating stage, reading, from the signal lines, a plurality of detecting signals outputted by the first sensing pads according to the first driving signal in a second operating stage, conducting the second sensing pads to the corresponding signal lines;

in the second operating stage, electrically coupling the third sensing pads in series;

in the second operating stage, providing a second driving signal to the third sensing pads; and in the second operating stage, reading, from the signal lines, the detecting signals outputted by the second sensing pads according to the second driving signal.

17. The control method of clam claim 16, further comprising:

in the first operating stage, conducting the third sensing pads to each other; and in the first operating stage, providing a shielding signal to the third sensing pads to reduce the interference between the first driving signal and the detecting signals.

18. The control method of claim 16, wherein the touch sensing circuit further comprises a plurality of third sensing pads, and the control method further comprises:

in the first operating stage, electrically coupling the third sensing pads in series; and in the first operating stage, providing the first driving signal to the third sensing pads.

* * * * *